Aug. 13, 1935.  W. A. SMITH  2,010,934
CEMENTING PROCESS AND APPARATUS
Filed April 13, 1934
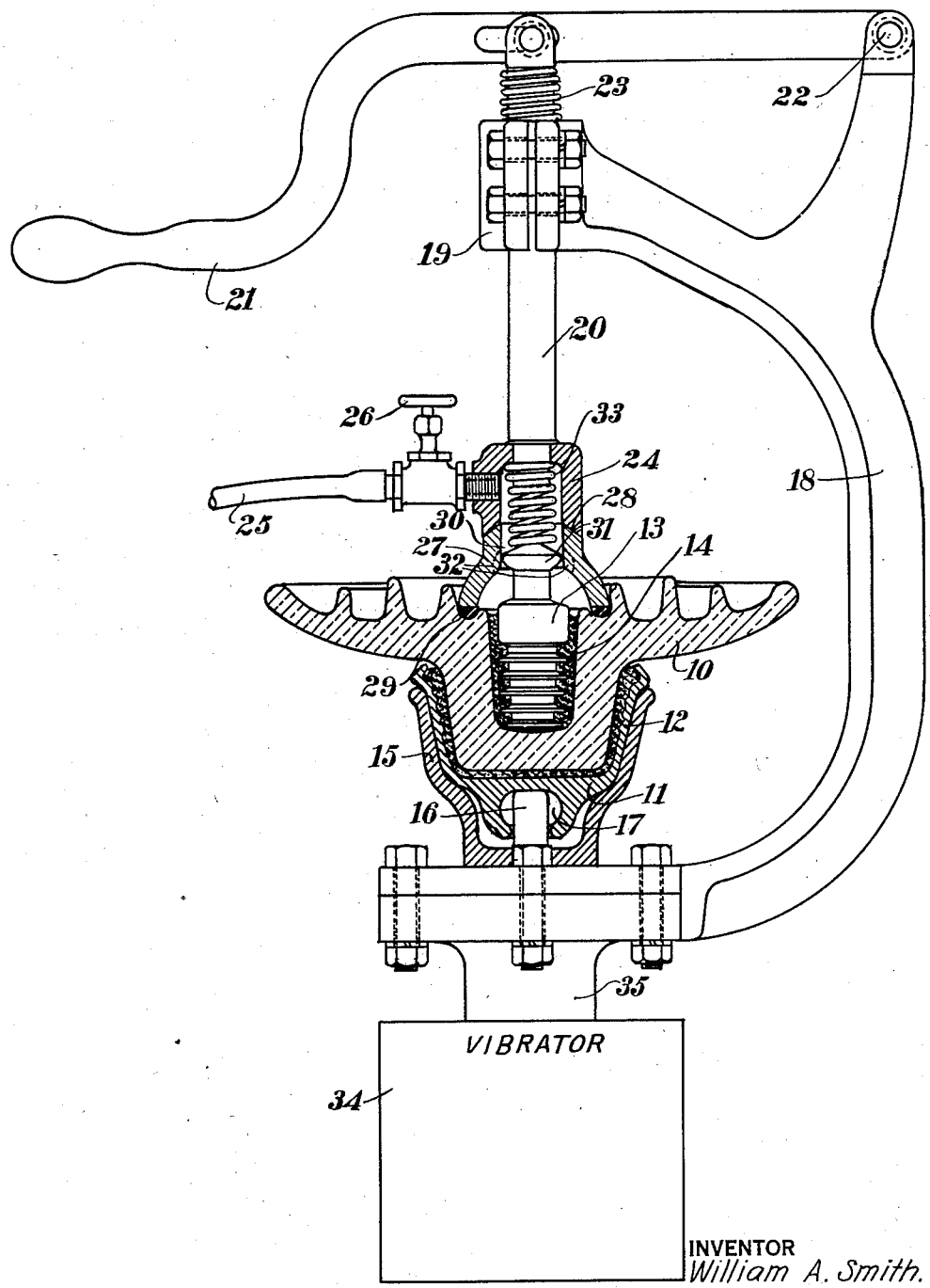
INVENTOR
William A. Smith.
BY *Alpheus J. Crane*
ATTORNEY Patented Aug. 13, 1935

2,010,934

UNITED STATES PATENT OFFICE 2,010,934

CEMENTING PROCESS AND APPARATUS

William A. Smith, Akron, Ohio, assignor to The Ohio Brass Company, Mansfield, Ohio, a corporation of New Jersey Application April 13, 1934, Serial No. 720,395

13 Claims. (Cl. 18—1)

This invention relates to a method and apparatus for assembling devices having parts secured together by cement, such as electric insulators.

One object of the invention is to provide a method and apparatus by which strong and uniform connection may be obtained between the connected parts.

Another object of the invention is to insure correct and uniform positioning of the connected parts.

A further object of the invention is to remove gas and air from the connecting cement to insure dense and uniform structure of the cement.

A further object of the invention is to prevent relative displacement of the connected parts during curing of the cement.

A further object of the invention is to provide an improved process and apparatus for assembling insulators and other devices having the parts thereof cemented together.

Other objects and advantages will appear from the following description.

The invention is exemplified by the combination and arrangement of parts shown in the accompanying drawing and described in the following specification and by the steps of the process explained in the specification and illustrated in the drawing.

The novel features of the invention are more particularly pointed out in the appended claims.

In the drawing the figure is an elevation with parts in section showing one form of apparatus for practicing the invention.

In the manufacture of electric insulators and other devices having parts connected together by cement, and particularly in the manufacture of insulators designed for supporting heavy mechanical loads, it is highly desirable that the cement connecting the parts shall be of uniform character without air pockets or other flaws in its texture, and that the parts shall be correctly aligned relative to one another and maintained in such alignment during the curing of the cement, or at least until the cement has become sufficiently hardened so that there is no further danger of interfering with the curing by relative movement of the parts. These, and other results, are accomplished by the present invention, as will be apparent from the following description.

In the drawing the numeral 10 designates, by way of illustration, the dielectric member of one form of insulator having a supporting cap 11 connected thereto by cement 12. The drawing illustrates the method of securing the pin 13 in the recess of the dielectric member 10 by means of cement 14. An assembly press or jig is provided with a seat 15 for receiving the cap 11; the seat being shaped to engage the cap and hold it firmly in position. A pin 16 may be provided in the base of the seat for entering a recess 17, commonly provided in the cap, and by means of which the cap is supported in use. The pin 16 will insure proper alignment of the axis of the cap relative to the seat 15.

The assembly jig is provided with an arm or standard 18 provided with a socket 19 in which a spindle or plunger 20 is mounted for vertical sliding movement. The spindle 20 is raised or lowered by a lever 21, pivoted at 22 on the standard 18. The spindle 20 may be provided with a spring 23 which automatically raises the spindle so that in operation the lower end of the spindle, together with the operating head, is normally held away from the seat 15 to permit ready insertion of the insulator and its cap within the seat. The lower end of the spindle 20 carries a suction head 24 to which a suction tube 25 is connected for exhausting the interior of the head. A suitable valve 26 is provided for controlling the passage between the head 24 and the suction hose 25. A collar 27 is provided with a tapered seat 28 shaped to fit the mouth of the suction head 24 and to form an air tight joint between the suction head and the interior of the collar. The lower rim of the collar has a rubber or other packing ring 29 fixed thereto, and of a size and shape to fit the face of the insulator surrounding the recess therein for receiving the pin. The collar or keeper 27 is provided with a reduced neck portion 30 which fits the head 31 of the pin 13 so as properly to align the pin in its recess when the collar is in place. By-pass openings 32 are provided in the neck of the collar about the head 31 to permit the space about the pin to be exhausted by the suction head 24. A spring 33 is secured within the suction head in position to bear upon the end of the pin and resiliently press it down in its recess.

In operation the insulator with the cap secured thereto is placed in the seat 15 and a suitable amount of cement is deposited by hand, or in any desired manner, in the recess of the dielectric member 10. The pin 13 is then pressed into the cement and the collar 27 placed in position over the head of the pin. This will properly align the pin relative to the dielectric member since the lower rim of the collar fits in a recess in the surface of the dielectric flange, which is concentric with the axis of the dielectric member. The suction head 24 is then moved downwardly by the lever 21 until it engages the seat 28. This will cause the spring 33 to engage the end of the pin 13 and insure its proper immersion in the cement 14. Sufficient pressure is exerted on the handle 21 to compress the rubber 29 and insure air tight closure of the space about the pin 31. The valve 26 is then opened to exhaust the air from the space about the pin 13 and above the cement 14. This will tend to withdraw any air or gas which may be caught in the cement and remove all bubbles or air pockets. To facilitate the removal of air or gas from the cement and to settle the cement in the recess in the dielectric member 10 and about the pin 13, the piece is submitted to vibration during the same time that it is subject to reduced pressure. The vibration may be produced in any suitable manner.

In the form of apparatus illustrated, the entire assembly jig is mounted upon a vibrator base 34 having a supporting stem 35 for the assembly jig and upon which the entire assembly apparatus is mounted. The housing 34 may be provided with any suitable mechanical or electrical vibrator apparatus for imparting vertical vibratory movements to the stem 35. The rate of vibration may vary through a wide range, but I have found that a vibration of from 15 to 20 cycles per second produces effective results. The vibration of the cement during the application of the reduced pressure thereto greatly facilitates the removal of air pockets and the settling of the cement into a uniform homogeneous mass.

By subjecting the cement to vibration and at the same time to a partial vacuum, it is possible to use a smaller percentage of water in the cement mixture so that a denser and stronger cement is obtained, as well as one free from flaws and air pockets. After the cement has been subjected to the combined action of vibration and suction, the vacuum may be broken by the valve 26, permitting air to enter the suction head so as to relieve it from pressure, whereupon the spring 33 will raise the head from the seat 28, leaving the collar 27 in place. The plunger 20 is then lifted by the spring 23 or by the handle 21 a sufficient amount to permit removal of the insulator together with its collar 27. The collar 27 is permitted to remain in place until the cement has sufficiently hardened to prevent accidental disturbance thereof. This prevents any weakening of the cement, due to accidental disturbance, during the process of setting and also insures proper alignment of the pin relative to the axis of the insulator, both of which features are of paramount importance in securing an insulator of high mechanical strength. Uniformly dense cement without flaws or air pockets obtained by the process also greatly adds to the uniform strength of the insulators obtained by the process.

Portland cement is commonly used for connecting together insulator parts, but it will be understood that the invention is not restricted to the particular apparatus shown or to the particular form of cement used, except as pointed out in the appended claims.

I claim:

1. The process of assembling insulator parts comprising the steps of positioning said parts relative to each other with freshly mixed cement interposed between said parts, properly locating said parts relative to each other by means of a keeper engaging each of the assembled parts and permitting the keeper to remain in position during curing of the cement.

2. The process of assembling an insulator pin in a recess in a dielectric member comprising the steps of inserting the pin in said recess with freshly mixed cement surrounding said pin in said recess, centering said pin in said recess by means of a keeper engaging said pin and said dielectric member and permitting the keeper to remain in position for holding said pin and dielectric member in proper relation relative to each other during curing of the cement.

3. The process of assembling an insulator pin in a recess in a dielectric member comprising the steps of inserting the pin in the recess with freshly mixed cement surrounding the pin in said recess, centering said pin in said recess by means of a collar having concentric portions engaging said pin and said dielectric member and permitting said collar to remain in engagement with said pin and dielectric member for holding said pin in properly aligned relation to said dielectric member during initial curing of said cement.

4. The process of assembling an insulator comprising the steps of inserting a pin in a recess in a dielectric member with freshly mixed cement surrounding said pin in said recess, placing a centering collar over said pin in contact with said dielectric member, closing said centering collar to atmosphere and exhausting air therefrom for extracting air from said cement.

5. The process of assembling an insulator comprising the steps of inserting a pin in a recess in a dielectric member with freshly mixed cement surrounding said pin in said recess, positioning a centering collar in contact with said pin and with said dielectric member for centering said pin in said recess, closing said centering collar to atmosphere and exhausting the space in said centering collar surrounding said pin for extracting air from said cement and at the same time vibrating said cement, releasing the vacuum from said centering collar and permitting said centering collar to remain in position to hold said pin in place during initial curing of the cement.

6. A jig for assembling an insulator comprising a dielectric member having a recess therein and a rib thereon concentric with said recess, a pin disposed in said recess and cement for retaining said pin in said recess, said jig including a keeper for centering said pin in said recess, said keeper comprising a collar having concentric portions engaging said pin and said rib respectively and adapted to remain in position during initial curing of said cement and after said insulator is removed from said jig.

7. An assembly jig for an insulator comprising a support for the insulator, a centering head for positioning a pin relative to said insulator, and means for vibrating said support with the insulator thereon and with said centering head in place to hold said pin in position in said insulator.

8. An assembly jig for an insulator comprising a support for a dielectric member having a recess therein, means for centering the pin in said recess, means for closing the space about said pin to atmosphere, means for exhausting said space to reduce the pressure therein to facilitate extraction of gas from cement in said recess, and means for vibrating said insulator while in position in said jig and while subjected to the action of said exhaust means.

9. An assembly jig for an insulator comprising a vibrator, a seat mounted on said vibrator for receiving a dielectric member having a recess therein, a centering head movable in the direction of the axis of said dielectric member when positioned in said seat and arranged to engage a pin in said recess to center said pin relative to said dielectric member, means for closing the space about said pin to atmosphere, and means for exhausting the air from said closed space to facilitate extraction of air from cement in said recess during vibration of said jig by said vibrator.

10. An assembly jig for an insulator comprising a dielectric member having a recess therein and a pin disposed in said recess, said jig including a collar adapted for engagement with said pin and said dielectric member for centering said pin in said recess, said collar being detachable from said jig while in engagement with said pin and said dielectric member to hold said pin in place in said recess after said insulator is removed from said jig.

11. An insulator jig comprising a table having a support for receiving an insulator, a plunger movable relative to said support, a suction head carried by said plunger, a centering collar adapted to engage an insulator on said support and to center a pin in a recess in said insulator, said centering collar forming a closed chamber with said suction head and said insulator about said pin to enable said suction head to extract gas or air from cement about said pin.

12. A jig for assembling insulators comprising a seat for supporting an insulator, a plunger having a suction head thereon, a centering collar for positioning a pin in a recess in said insulator, and a spring carried by said plunger for holding said pin in position in said recess when said plunger is removed from said insulator.

13. An assembly jig for insulators comprising a seat for supporting an insulator, a plunger having a suction head thereon, a centering collar cooperating with said suction head for forming a closed chamber about a pin disposed in a recess in said insulator, means for exhausting the chamber thus formed and means for vibrating the insulator while the chamber is so exhausted.

WILLIAM A. SMITH.